INVENTORS.
George Chieger.
Adrian F. Hulverson.
BY
Carness Dickey & Pierce
ATTORNEYS.

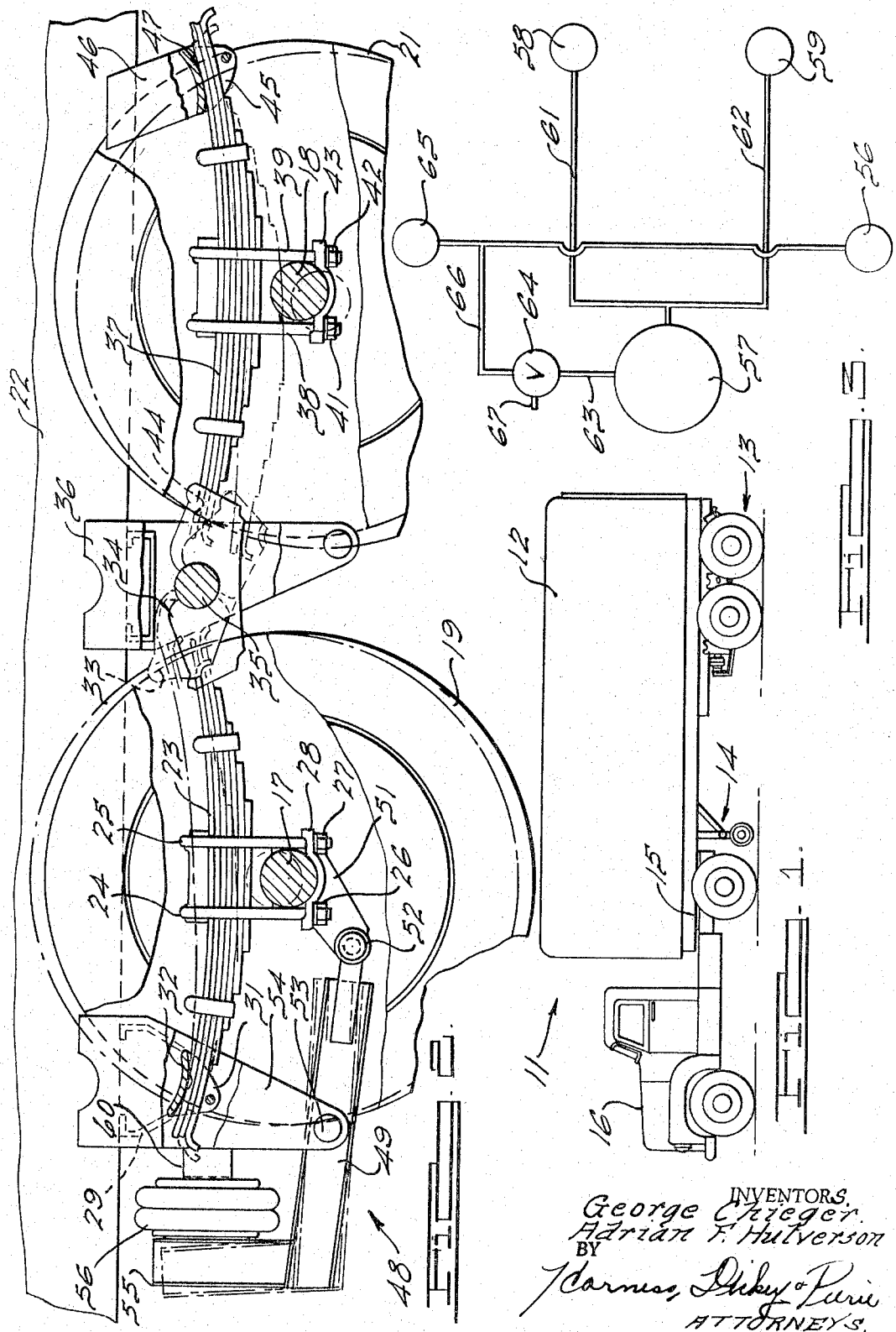

— Patented Apr. 25, 1967

3,315,978
AXLE LIFT (RADIUS ROD)
George Chieger, Birmingham, and Adrian F. Hulverson, Grosse Pointe Woods, Mich., assignors to Fruehauf Corporation, Detroit, Mich., a corporation of Michigan
Filed Mar. 4, 1965, Ser. No. 437,143
4 Claims. (Cl. 280—104.5)

This invention relates to a suspension system for a heavy duty vehicle and more particularly to a suspension system for a heavy duty vehicle embodying an axle lifting device that operates through an axle locating radius rod.

An inherent problem in heavy duty vehicles is that the riding and handling characteristics of the vehicle are relatively poor when it is traveling with light loads. These characteristics are a result of the high spring rate of the wheel suspension necessary to accommodate the maximum loads carried by these vehicles.

One way of alleviating this problem in vehicles having plural axle wheel suspensions is to remove the road wheels of at least one of the axles from contact with the road when the vehicle is not fully loaded. In addition to improving the handling characteristics of the vehicle, the removal of the wheels from the road saves wear on the associated set of tires.

A vehicle wheel suspension embodying this invention includes an axle lift for elevating at least one of a plurality of axles with a minimum of difficulty and may be fully automatic or manually operated. The wheel suspension comprises a spring that supports an axle from a vehicle frame. The axle is located by a radius rod that is pivotally connected at one of its ends to the axle. The radius rod also is pivotally connected to the vehicle frame. An adjustment device in the form of an inflatable air bag is interposed between an extension of the radius rod and the frame for adjusting the angular position of the radius rod with respect to the frame and, accordingly, for adjusting the distance between the axle and the frame.

Therefore, one object of this invention is an improved means for lifting one of a pair of tandem axles to facilitate highway travel of a vehicle in a lightly loaded condition.

Another object of the invention is an improved axle lift wherein elevation of the axle is accomplished through an axle locating radius rod.

Another object of the invention is an air bag actuated means that acts through a radius rod for elevating a vehicle axle.

Other objects and advantages of this invention will be apparent from the following description, claims and drawings, wherein:

FIGURE 1 is a side elevational view of a semi-trailer having a wheel suspension embodying this invention;

FIGURE 2 is an enlarged view of the encircled portion of FIGURE 1 with portions broken away and shown in section;

FIGURE 3 is a schematic diagram of the air system of the vehicle shown in FIGURE 1;

Figure 4:
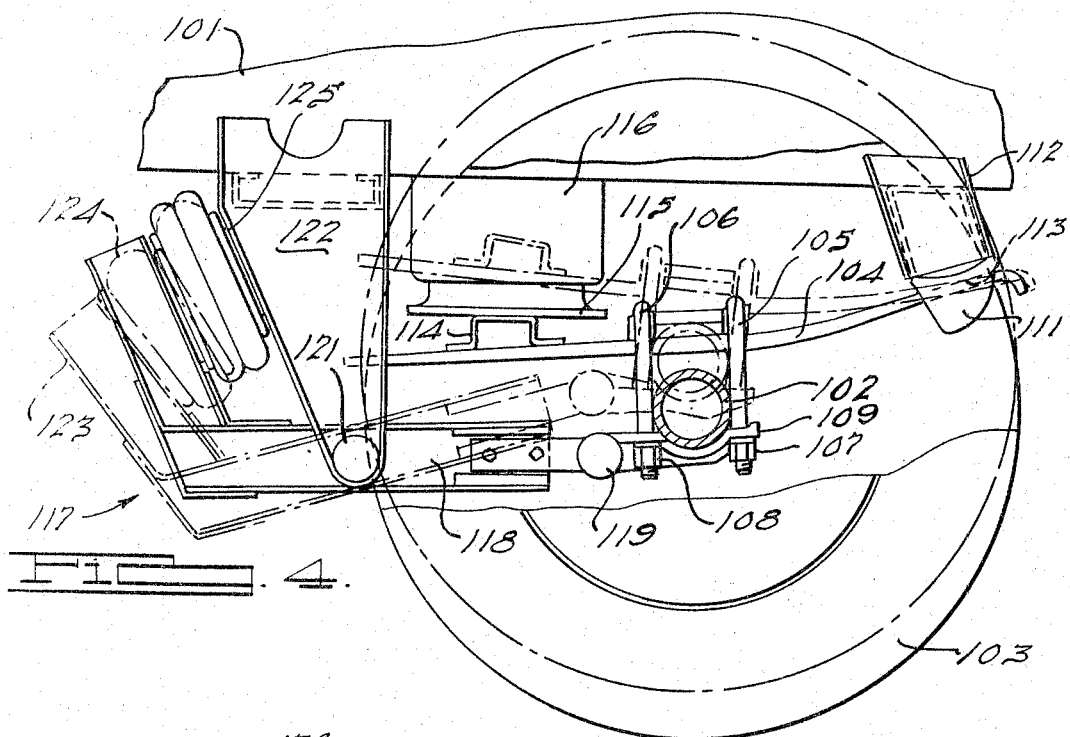
FIGURE 4 is a side elevational view, in part similar to FIGURE 2, showing another embodiment of the invention.

Referring now to FIGURE 1, the reference numeral 11 identifies a heavy duty vehicle comprising a van-type trailer 12 having a tandem axle wheel suspension 13. A landing gear 14 is positioned at the front of the trailer 12 adjacent a fifth wheel 15 which connects the trailer to a tractor 16. It is to be noted that the trailer 11 and tractor 16 are conventional in construction except for the wheel suspension 13 which will be described hereinafter.

Referring now to FIGURE 2, the tandem axle wheel suspension 13 comprises a front axle 17 and a rear axle 18 which support front and rear pairs of road wheels 19 and 21, respectively, at each end thereof. A frame comprising a rail 22 extends longitudinally above the axles 17 and 18 at each side of the trailer 12. Since the suspension structure is identical at each side of the trailer 12, only one side will be described.

The axle 17 is supported by a leaf spring 23 to which it is affixed by U-bolts 24 and 25, nuts 26 and 27, and a pillow block 28. The forward end of the leaf spring 23 reacts against the frame rail 22 through a depending spring hanger 29 that is affixed as by welding to the frame rail 22. The spring hanger 29 comprises a pair of laterally spaced depending arms 31 that engage opposite sides of the leaf spring 23 to prevent lateral movement. A bumper surface 32 is provided between the depending arms 31 to provide a reaction member for the forward end of the leaf spring 23.

The rear end of the leaf spring 23 engages an arcuate surface 33 of a load equalizing yoke 34 that is pivotally supported by a pivot pin 35 upon a depending bracket 36. The bracket 36 is, in turn, affixed as by welding to the frame rail 22.

The rear axle 18 is affixed to the center of a leaf spring 37 by a pair of U-bolts 38 and 39, nuts 41 and 42, and a pillow block 43. The forward end of the leaf spring 37 engages a curved rearward surface 44 of the equalizer yoke 34. The rear end of the leaf spring 37 is laterally fixed through engagement with depending arms 45 of a spring hanger bracket 46 that is affixed to the frame rail 22. A curved bumper surface 47 of the spring hanger bracket 46 engages the upper side of the leaf spring 37 to provide a reaction member for it.

It should be readily apparent that the pivotally supported equalizer yoke 34 will move to an angular position that will equalize the loading upon the axles 17 and 18 when both road wheels 19 and 21 are in engagement with the surface of the road. There are instances, however, when it may be desirable to remove one of the pairs of wheels from engagement with the road surface to improve the handling qualities of the vehicle. Since the springs 23 and 37 have relatively high rate, a very harsh ride and a great degree of axle hop may be experienced when the trailer 12 is empty or only partially loaded. A combined radius rod and axle lift assembly, indicated generally by the reference numeral 48, is provided for locating one of the axles and for removing its associated road wheels from engagement with the road. In the illustrated embodiment, the associated wheels 19 of the front axle 17 are removed from engagement with the road, however, it is to be understood that the same structure could be used for removing the wheels of the rear axle 18 from the road or the wheels of any axle of a plural axle vehicle.

The radius rod and axle lift assembly 48 comprises a radius rod 49 that is pivotally connected at its rear end to a bracket 51 that is affixed to the axle 17 in any known manner. The pivotal connection between the radius rod 49 and the bracket 51 is indicated at 52. The radius rod 49 is also pivotally supported intermediate its ends upon a pivot pin 53 that is affixed to a depending bracket 54 that is welded or otherwise secured to the frame rail 22. An upstanding arm 55 is welded or otherwise secured to a forward extension of the radius rod 49. An inflatable air lift bag 56 engages the arm 55 and a reaction plate 60 that is affixed to the forward end of the bracket 54.

The air system for inflating the air lift bag 56 is shown schematically in FIGURE 3 and comprises a reservoir 57 that is charged with air under pressure by an engine driven air compressor (not shown) or any other similar mechanism. The reservoir 57 supplies air under pressure to air brakes 58 and 59 through conduits 61 and 62, respectively. An air line 63 also connects the reservoir 57 with a two-way valve 64. The two-way valve 64 is connected to the air lift bag 56 and a similar bag 65 positioned at the opposite side of the vehicle by a pressure line 66. The valve 64 also is provided with an exhaust vent 67.

Referring again to FIGURE 2, the solid line view illustrates the components as they appear when the air lift bag 56 is in its uninflated or collapsed condition. Compression of the air lift bag 56 is accomplished by manipulating the valve 64 so that the line 66 is vented to the atmosphere through the exhaust vent 67. When the bag 56 is uninflated, the road wheel 19 and the road wheel 21 are both in engagement with the road and the equalizer yoke 34 functions in the manner that has been described.

If it is desired to remove the road wheel 19 from engagement with the road surface due to a light loading of the trailer 12, the air lift bag 56 and the corresponding bag 65 at the opposite side of the vehicle are inflated by manipulating valve 64 so that open communication is provided between the reservoir 57 and the air lift bags 56 and 65. When the bag 56 is inflated, it moves the radius rod 49 pivotally relative to the frame rail 22 to the position shown in the dotted line view in FIGURE 2. The pivotal movement of the radius rod 49 causes the axle 17 to swing upwardly relative to the frame rail 22 compressing the leaf spring 23 about the reaction member provided by the bumper surface 32. The upward movement of the leaf spring 23 causes the yoke assembly 34 to pivot in a clockwise direction about its pivot pin 35. This rotation exerts a downward force upon the forward end of the rear leaf spring 37 so that there is relative movement between the axles 17 and 18. The relative movement, which is a result of the action of the equalizer yoke 34, permits a greater degree of relative lift of the axle 17 for a given degree of movement of the air lift bag 56 than would be possible if the leaf springs 23 and 37 were not interconnected. In its fully inflated position, the air lift bag 56 lifts the road wheel 19 from engagement with the road.

It is to be understood that the operation of the valve 64 may be either manual or automatic. If automatic lifting of the axle 17 is desired, the valve 64 may be made responsive to the deflection of the leaf spring 23. The valve 64 will then inflate the air lift bag 56 when the leaf spring 23 is undeflected or only slightly deflected, indicating a light load in the trailer 12.

Referring now to FIGURE 4, a vehicle comprising a frame rail is shown partially at 101. An axle 102 extends transversely below the frame rail 101 and supports a road wheel 103 at each side of the vehicle. At least one other axle and road wheel assembly (not shown) may be provided beneath the frame rail 101. The additional axle and wheel assemblies as well as their relative wheel suspension may be of any known type.

Referring now to the suspension of the axle 102, it is to be understood that a similar suspension is provided at each side of the vehicle, therefore, only one side will be described. A single leaf spring 104 is affixed to the axle 102 by U-bolts 105 and 106, nuts 107 and 108, and a pillow block 109. The rear end of the left spring 104 is held against lateral movement by depending arms 111 of a spring hanger 112 that is affixed, as by welding, to the frame rail 101. A bumper surface 113, positioned between the depending arms 111, engages the upper surface of the leaf spring 104 to form a reaction surface for it. The forward end of the leaf spring 104 is fixed to a bracket 114 by bolts or other suitable fasteners (not shown). The bracket 114 is affixed to the foot 115 of an air spring assembly 116 that is supported by the frame rail 101 in a known manner.

The axle 102 is located by a combined air lift and radius rod assembly indicated generally by the reference numeral 117. The assembly 117 comprises a radius rod 118 one end of which is pivotally connected, as at 119, to the pillow block 109. An intermediate portion of the radius rod 118 is pivotally supported by a pivot pin 121 that is affixed in a depending bracket 122 which is welded or otherwise secured to the frame rail 101. An upwardly extending arm 123 is welded or otherwise fixed to a forward extension of the radius rod 118. An inflatable air lift bag 124 engages the arm 123 and a reaction plate 125 that is affixed to the depending bracket 122.

Figure 5:
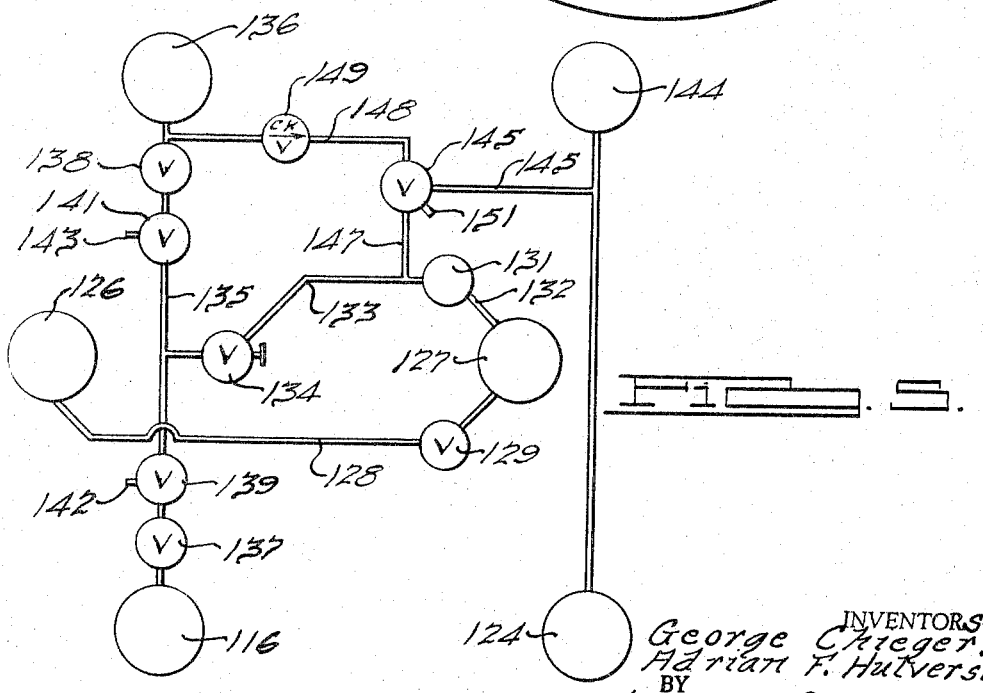
FIGURE 5 is a schematic view of the air system of the vehicle shown in FIGURE 4.

Referring now to FIGURE 5, which shows schematically the air system of the embodiment shown in FIGURE 4, an air brake reservoir 126 is charged with air from an engine-driven air compressor (not shown) or in any other suitable manner. The air brake reservoir 126 is connected to an air ride tank 127 by an air conduit 128. A pressure protection valve 129 is positioned in the conduit 128 to maintain a substantially uniform pressure within the air ride tank 127 and to insure that the air brake reservoir 126 will not be depleted if a leak should occur in the air ride system. An air filter 131 is positioned in an outlet conduit 132 of the air ride tank 127. An air ride conduit 133 connects the air filter 131 with a height control valve 134 that supplies air under pressure to an air spring conduit 135. The air spring conduit 135 is connected to the air spring 116 and a similar air spring 136 positioned at the opposite side of the vehicle. Valves 137 and 138 are interposed between the height control valve 134 and the air springs 116 and 136, respectively, to permit the air springs 116 and 136 to be charged with air independently of the air ride tank, if desired. Two-way valves 139 and 141 are positioned adjacent each of the air bags 116 and 136, respectively. The two-way valves 139 and 140 will connect the respective air bags either to the height control valve or to atmospheric vents 142 and 143 should it be desired to deflate either of the air bags for any reason.

The air lift bag 124 and a similar air lift bag 144 positioned at the opposite side of the vehicle, are connected by conduit 145 to a four-way valve 146. The four-way valve 146 permits the air lift bag 124 and 144 to be charged with air under pressure either directly through a connection 147 with the outlet side of the air ride tank or indirectly through a connection 148 with the air springs 116 and 136. A check valve 149 is positioned within the conduit 148 to insure that high pressure air in the air lift bags 124 and 144 will not be transferred back to the air spring 136. The valve 146 may be manipulated either manually or automatically in response to variations in the pressure in the air spring 116 and 136. If automatic operation is desired, the air lift bags 124 and 144 will be inflated when a low air pressure exists within the air springs 116 and 136 as the low pressure indicates a light loading upon the axle 102. The air lift bags 124 and 144 may be deflated by manipulating the valve 146 to open the bags to the atmosphere through a vent 151.

Referring again to FIGURE 4, the solid line view shows the components as they appear when the air in bag 124 is deflated and the axle 102 is heavily loaded so that the load wheel 103 is in engagement with the road. If a light load is present upon the axle 102, the road wheel 103 may be removed from engagement with the road by manipulating the valve 146 so that the conduit 145 is exposed to air under pressure from either the conduit 147 or the conduit 148. The bag 124 will then expand to its inflated position as shown in the dotted line view in FIGURE 4. As the bag 124 is inflated, the radius rod 118 is rotated in a counter-clockwise direction relative to frame rail 101 about the pivot pin 121. The counterclockwise rotation of the radius rod 118 causes the leaf spring 104 to be deflected about the bumper 113 and the air spring 116 to be compressed. The axle 102 is then raised removing the road wheel 103 from engagement with the road surface.

It is to be understood that the embodiment shown in FIGURE 4 may be used in connection with a leaf spring equalizing system of the type shown and described in FIGURE 2 or may be used in systems wherein the other axles of the vehicle are supported independently of the axle 102. Various other changes and modifications may be made from the embodiments shown and described, which are exemplary only of preferred embodiments this invention may take, without departing from the spirit and scope of the invention as defined by the appended claims.

What is claimed is:

1. A wheel suspension for a heavy duty vehicle comprising
a frame,
an axle,
a rigid bracket fixed relative to said axle,
road wheels supported at each end of said axle,
spring means for supporting said axle with respect to said frame,
a radius rod for locating said axle,
means pivotally connecting one end of said radius rod directly to said rigid bracket,
means pivotally connecting another portion of said radius rod relative to said frame for locating said axle longitudinally relative to said frame, and
an inflatable air bag operatively engaging said frame and an extension of said radius rod for adjusting the angular relationship between said radius rod and said frame to adjust the spacing between said axle and said frame, said air bag being inflatable from a collapsed position wherein said road wheels engage the road to an inflated position wherein said road wheels are spaced from the road.

2. A wheel suspension for a heavy duty vehicle comprising
a frame,
an axle,
a rigid bracket fixed reltaive to said axle,
road wheels supported at each end of said axle,
a leaf spring,
means operatively connecting the central portion of said leaf spring to said axle,
means operatively connecting one end of said left spring to said frame,
means including an air spring operatively connecting the other end of said leaf spring, to said frame,
a radius rod for locating said axle,
means pivotally connecting one end of said radius rod directly to said rigid bracket,
means pivotally connecting another portion of said radius rod relative to said frame for locating said axle longitudinally relative to said frame, and
an inflatable air bag operatively engaging an extension of said radius rod and said frame for altering the angular relationship between said radius rod and said frame to adjust the spacing between said axle and said frame, said air bag inflatable from a collapsed position wherein said road wheels engage the road to an inflated position wherein said road wheels are spaced from the road.

3. A tandem axle wheel suspension for a heavy duty vehicle comprising
a frame,
a pair of spaced axles,
road wheels supported at each end of each of said axles,
spaced pairs of load carrying springs extending between said frame and said axles, respectively,
equalizing means cooperating with said springs for equalizing the loading upon said axles,
a radius rod for locating at least one of said axles,
a rigid bracket fixed relative to said one axle,
means pivotally connecting one end of said radius rod directly to said rigid bracket,
means pivotally connecting a portion of said radius rod relative to said frame for locating said one axle longitudinally relative to said frame, and
an inflatable air bag interposed between said frame and an extension of said radius rod for altering the angular position of said radius rod relative to said frame to adjust the spacing between said frame and said one of said axles, said air bag being inflatable from a collapsed position wherein the road wheels carried by said one of said axles are in engagement with the road to an inflated position wherein said road wheels are spaced from the road.

4. A tandem axle wheel suspension for a heavy duty vehicle comprising
a frame,
a pair of longitudinally spaced axles,
road wheels supported at each of the ends of each of said axles,
an equalizer lever pivotally supported by said frame between said axles for rotation about an axis extending laterally of said vehicle,
laterally spaced pairs of leaf springs extending between said frame and said axles, adjacent ends of said springs engaging said equalizer lever on the opposite sides of the rotational axis thereof for equalizing the loading between said axles,
a radius rod for locating at least one of said axles,
a rigid bracket fixed relative to said one axle,
means pivotally connecting one end of said radius rod directly to said rigid bracket,
means pivotally connecting a portion of said radius rod relative to said frame for locating said one axle longitudinally relative to said frame,
an inflatable air bag interposed between said frame and an extension of said radius rod for altering the angular relationship of said radius rod relative to said frame to adjust the spacing between said one of said axles and said frame, said air bag being inflatable from a collapsed position wherein the road wheels carried by a said one of said axles are in engagement with the road to an inflated position wherein said road wheels are spaced from said valve.

References Cited by the Examiner

UNITED STATES PATENTS 3,178,201 4/1965 Richnow.
3,201,141 8/1965 Bernstein.

BENJAMIN HERSH, *Primary Examiner.*

P. GOODMAN, *Assistant Examiner.*